(12) United States Patent
Hannagan

(10) Patent No.: US 8,244,183 B2
(45) Date of Patent: Aug. 14, 2012

(54) CONCURRENT SYNC CHANNEL SEARCHING

(75) Inventor: Steve Hannagan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 985 days.

(21) Appl. No.: 12/190,508

(22) Filed: Aug. 12, 2008

(65) Prior Publication Data

US 2010/0041338 A1 Feb. 18, 2010

(51) Int. Cl.
*H04B 15/00* (2006.01)
(52) U.S. Cl. ....... 455/62; 455/67.11; 455/428; 455/525; 342/357.63; 342/378; 370/209; 370/320; 375/130
(58) Field of Classification Search ............... 455/67.11, 455/428, 525, 62; 342/357.63, 378; 370/209, 370/320; 375/130
See application file for complete search history.

(56) References Cited

U.S. PATENT DOCUMENTS

| | | | | |
|---|---|---|---|---|
| 5,577,025 | A * | 11/1996 | Skinner et al. | 370/209 |
| 5,696,762 | A * | 12/1997 | Natali et al. | 370/320 |
| 5,828,957 | A * | 10/1998 | Kroeger et al. | 455/428 |
| 6,249,539 | B1 * | 6/2001 | Harms et al. | 375/130 |
| 6,636,178 | B2 * | 10/2003 | Gronemeyer | 342/378 |
| 6,831,940 | B2 * | 12/2004 | Harms et al. | 375/130 |
| 7,002,516 | B2 * | 2/2006 | Gronemeyer | 342/378 |
| 7,039,364 | B2 * | 5/2006 | Majaniemi | 455/67.11 |
| 7,479,924 | B2 * | 1/2009 | Jia et al. | 342/357.63 |
| 2005/0075125 | A1 * | 4/2005 | Bada et al. | 455/525 |
| 2007/0248068 | A1 | 10/2007 | Onggosanusi et al. | |

FOREIGN PATENT DOCUMENTS

| | | |
|---|---|---|
| EP | 1906686 A1 | 4/2008 |
| WO | WO9966649 | 12/1999 |
| WO | WO2008013339 A1 | 1/2008 |

OTHER PUBLICATIONS

International Search Report and Written Opinion—PCT/US2009/053027, International Search Authority—European Patent Office—Dec. 21, 2009.
Motorola, "EUTRA SC-FDMA Uplink Pilot/Reference Signal Design," 3GPP Draft R1-063057, 3rd Generation Partnership Project, Mobile Competence Centre, 650 Route des Lucioles; F-06921 Sophia-Antipolis Cedex; France Nov. 2, 2006.
Agilent Technologies Solutions for 3GPP LTE, Technical overview, Sep. 19, 2007, 11 pages, USA.
Rohde & Schwarz, UMTS long Term Evolution(LTE) Technology Introduction, Internet website: www.rohde-schwarz.com, 32 pages, Germany, Mar. 2007.

* cited by examiner

*Primary Examiner* — April G Gonzales
(74) *Attorney, Agent, or Firm* — Alan Gordon; Peter A. Clevenger

(57) ABSTRACT

A bank of correlator modules is used to concurrently execute a series of sync channel searches in a system in which the available frequency spectrum is larger than a channel bandwidth and in which a sync channel bandwidth is more narrow than the channel bandwidth.

19 Claims, 6 Drawing Sheets

CONCURRENT SYNC CHANNEL SEARCHING

BACKGROUND

1. Field

The present invention relates generally to wireless communications and more specifically to synchronization in a wireless communication system.

2. Background

Wireless communication systems are widely deployed to provide various types of communication content such as, for example, voice, data, video and the like. Typically, commercial wireless communication systems use multiple-access techniques to allow multiple users to share the available system resources such as code division multiple access (CDMA), time division multiple access (TDMA), frequency division multiple access (FDMA), orthogonal frequency division multiple access (OFDMA) systems, and the like.

In a wireless communication system, a base station (BS) communicates with a user equipment device (UE) over a downlink path from the BS to the UE and over an uplink path from the UE to the BS. When a UE initially powers up, before it can either receive information over the downlink or transmit information over the uplink, its first action is typically to synchronize with the system. The process of synchronizing typically includes, among other things, acquiring system time as well as estimating and correcting frequency offset errors in the UE. For this purpose, a group of base stations typically transmits a common synchronization channel (sync channel) having a known symbol value. Upon initial system entry, a UE searches for the sync channel as a precursor to notifying the base station as to its presence in the system.

Because a UE cannot begin to communicate information over the system until it has achieved synchronization, it is advantageous for the user equipment device to expeditiously obtain synchronization upon initial system entry.

SUMMARY

In a wireless system, a user equipment module synchronizes with the system before communicating with the base station. To this purpose, a user equipment device (UE) searches for a synchronization (sync) channel by testing a fairly large number of hypothetical center frequencies and time offsets. The user equipment device tunes an RF receiver to receive a wideband channel bandwidth. The front end produces digital samples having a bandwidth equal to the channel bandwidth. The samples are input into a bank of correlator modules. Each module shifts the samples to a different center frequency. The shifted samples are then filtered to the bandwidth of a sync channel. The filtered samples are correlated with a known sync-channel symbol. The results of the concurrent correlation processes are compared to determine a most likely center frequency and time synchronization hypothesis.

In one aspect, the signal acquisition process includes receiving a set of samples spanning a channel bandwidth. The set of samples is concurrently frequency shifted to a set of channel center frequencies to produce multiple sets of shifted samples. According to one aspect, the frequency shifting process is executed using a phase ramp. Each set of the multiple sets of shifted samples is concurrently filtered to produce multiple sets of band limited samples such that the bandwidth of each set of the multiple sets of band limited samples corresponding to a sync channel bandwidth. Each set of the multiple sets of band limited samples is concurrently correlated with a sync channel symbol to determine a set of correlation results. The set of correlation results is compared to determine a likely sync channel center frequency.

In one aspect, a first channel center frequency of the set of channel center frequencies differs from a second channel center frequency of the set of channel center frequencies by less than a raster step size in order to detect a frequency offset in a receiving unit. In another aspect, an information signal spanning the channel bandwidth is received and processed during the process of frequency shifting and the filtering. In some cases, the information signal is transmitted by a servicing base station and the likely sync channel center frequency corresponds to a center frequency of a neighboring base station.

In another aspect, a machine readable medium contains executable program instructions which when executed by a digital processing system cause a system to perform a method of signal acquisition. The instructions include instructions for receiving a set of samples spanning a channel bandwidth. The set of samples is concurrently frequency shifted to a set of channel center frequencies to produce multiple sets of shifted samples. Each set of the multiple sets of shifted samples is concurrently filtered to produce multiple sets of band limited samples, a bandwidth of each set of the multiple sets of band limited samples corresponding to a sync channel bandwidth. Each set of the multiple sets of band limited samples is concurrently correlated with a sync channel symbol to determine a set of correlation results. The set of correlation results is compared to determine a likely sync channel center frequency.

In yet another aspect, means for signal acquisition include receiving a set of samples spanning a channel bandwidth. The set of samples is concurrently frequency shifted by shifting means to a set of channel center frequencies to produce multiple sets of shifted samples. Each set of the multiple sets of shifted samples is concurrently filtered by filtering means to produce multiple sets of band limited samples, a bandwidth of each set of the multiple sets of band limited samples corresponding to a sync channel bandwidth. Each set of the multiple sets of band limited samples is concurrently correlated with a sync channel symbol by correlating means to determine a set of correlation results. The set of correlation results is compared to determine a likely sync channel center frequency The system may use a client station having an RF front end configured to be coupled to a wireless link and to produce digital samples of a received signal spanning a channel bandwidth. The client station may also have a correlator bank having a frequency shift module configured to receive the digital samples. The frequency shift module may be configured to concurrently frequency shift the digital samples to a set of channel center frequencies to produce multiple sets of shifted samples. The correlator bank may also have a filter and downsample module configured to concurrently filter each set of the multiple sets of shifted samples to produce multiple sets of band limited samples, a bandwidth of each set of the multiple sets of band limited samples corresponding to a sync channel bandwidth. The correlator bank may also have a correlator module to concurrently correlate each set of the multiple sets of band limited samples with a sync channel symbol to determine a set of correlation results. The client station may also have a buffer for storing the set of correlation results.

In addition, the frequency shift module may be configured to frequency shift the digital samples by using a phase ramping technique. In some cases, a first channel center frequency of the set of channel center frequencies differs from a second channel center frequency of the set of channel center frequencies by less than a raster step size in order to detect a frequency offset in the client station. The client station may also have a sample buffer and a fast Fourier transform module configured to process an information signal spanning the channel bandwidth while the set of correlator modules determines the set of correlation results.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. An OFDMA network may be implemented according to an industry standard, such as IEEE 802.11, IEEE 802.16, IEEE 802.20, Flash-OFDM(R), Long Term Evolution (LTE) and the like or according to a proprietary design.

LTE uses orthogonal frequency division multiplexing (OFDM) on the downlink. OFDM partitions the system bandwidth into multiple orthogonal subcarriers, which are also commonly referred to as tones, bins, or the like. Each subcarrier may be modulated with data or, as is the case for the sync channel, may remain unmodulated or may be modulated with one of a plurality of known symbol values.

Figure 1:
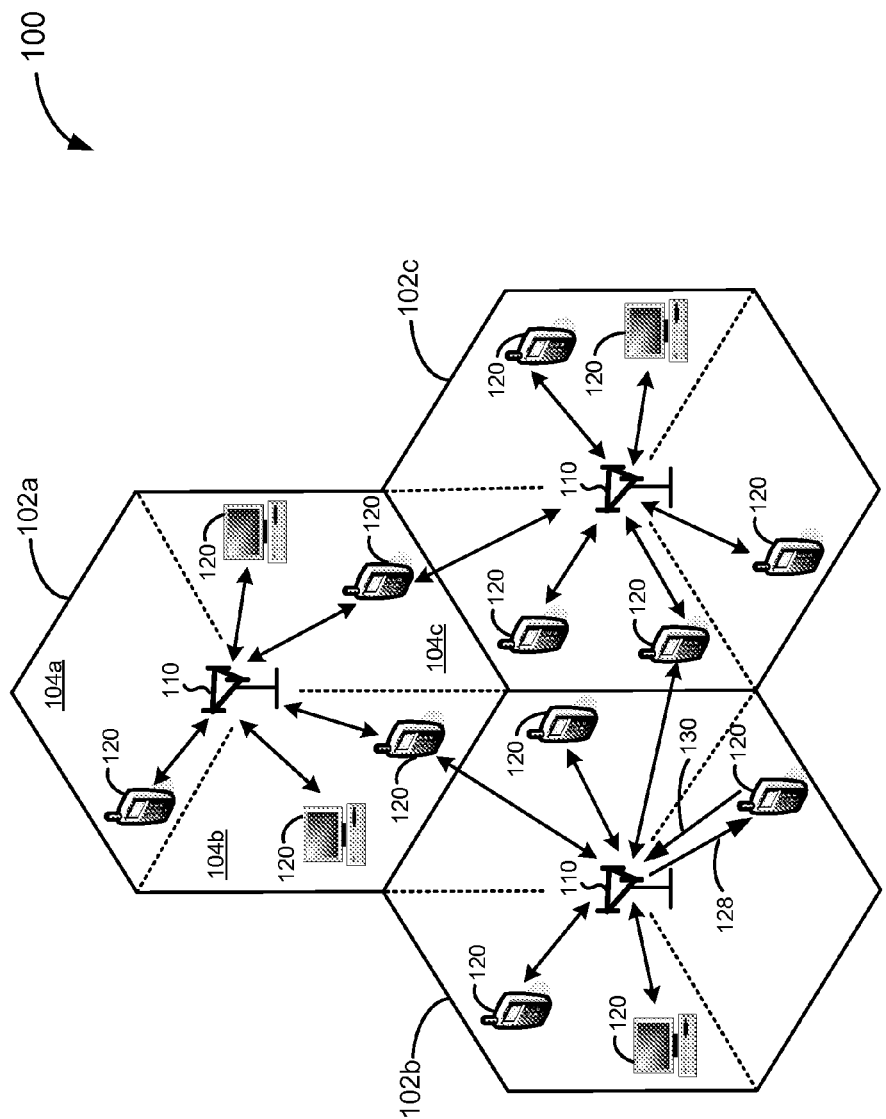
FIG. 1 illustrates a wireless communication system with multiple base stations and multiple user equipment devices.

FIG. 1 illustrates a wireless communication system 100 with multiple base stations 110 and multiple user equipment devices (UE) 120. A base station is generally a fixed-location station that communicates with the UEs within its coverage area, such as coverage areas 102a, 102b, and 102c. To improve system capacity, a base station coverage area may be partitioned into multiple smaller areas such as shown in FIG. 1 as sectors 104a, 104b, and 104c of coverage area 102a.

A base station is sometimes referred to as a base station transceiver subsystem (BTS) or access point and in general can be any wireless network entry point. Likewise, a UE may be fixed, nomadic or mobile. A UE is sometimes referred to as a subscriber system, subscriber unit, mobile station, mobile, remote station, remote terminal, access terminal, user terminal, user agent, user device or customer premise equipment. User equipment can take the form of a cellular telephone, cordless telephone, Initiation Protocol (SIP) phone, wireless local loop (WLL) station, personal digital assistant (PDA), handheld device, gaming terminal, wireless modem card or dongle, or other processing device used to connect with a wireless communication system.

Upon initial system entry, a UE 120 executes a system initialization process. As part of this process, among other things, the UE 120 typically determines the channel bandwidth and its center frequency within the available spectrum, acquires base station timing and corrects for any frequency errors associated with its internal clock. When synchronized, the UE 120 can begin to collect base station specific information as well system parameters. Once the system initialization is complete, the UE 120 can establish a bidirectional communication link with the base station 110 over a downlink 128 (or forward link) from the base station 110 to the UE 120, and an uplink 130 (or reverse link) from the UE 120 to the base stations 110.

Figure 2:
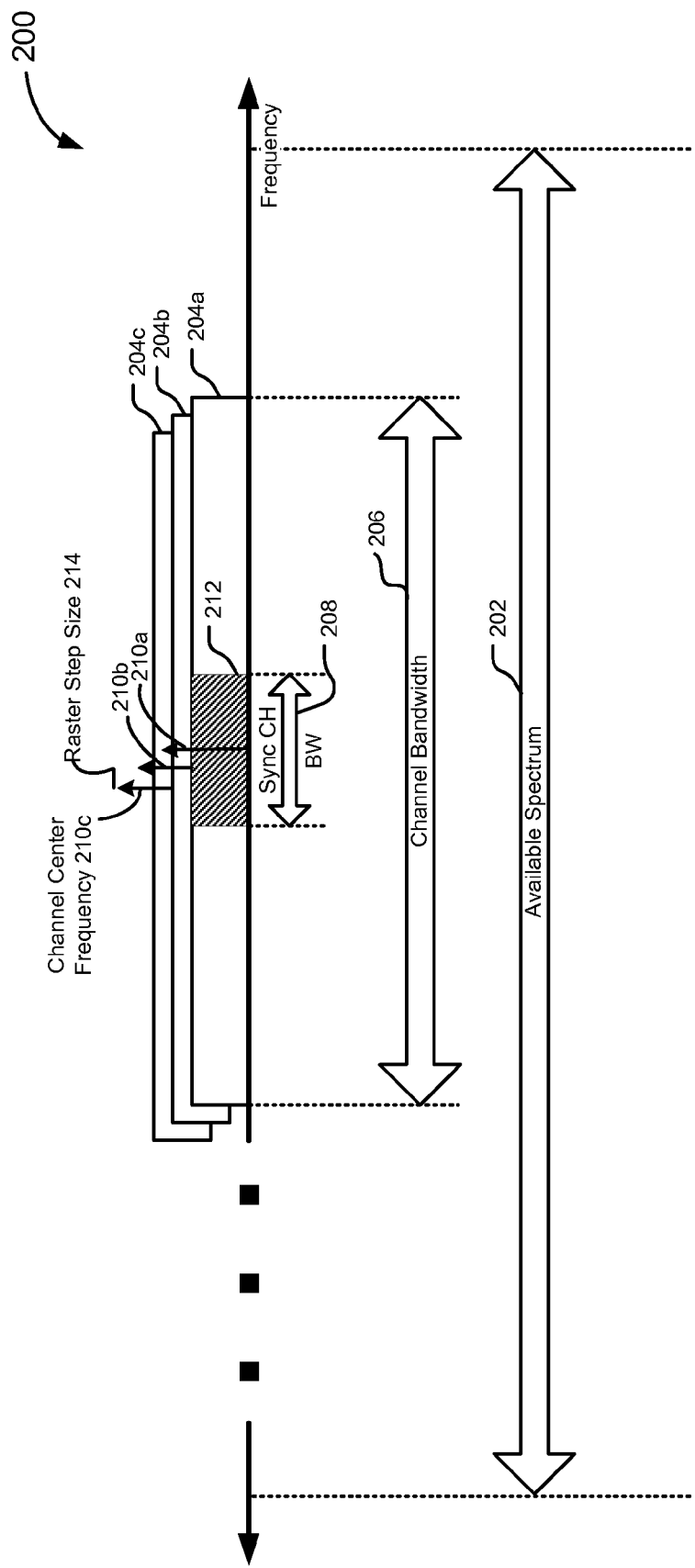
FIG. 2 is a representation of frequency spectrum for use in an OFDMA system.

Many OFDM systems can operate using either licensed or unlicensed spectrum. In each case, it is common that the channel bandwidth is smaller than the available spectrum. For example, FIG. 2 is a representation of frequency spectrum 200 for use in an OFDM system. Assuming a licensed system for purposes of example, a government may provide an exclusive license which covers as much as 75 MHz or more of available spectrum 202. However, typical OFDM systems do not provide for a channel bandwidth 206 of this magnitude. For example, LTE specifies a range of channel bandwidths over which a base station may transmit signals associated with a common channel from 5 MHz to 20 MHz and various steps in between. In addition, a typical system design allows for fine adjustment of the center frequency 210 of the channel bandwidth 206 according to predefined raster step size. For example, according to LTE, the raster step size 214 is a mere 100 kHz. Thus, in a system having an available spectrum of 75 MHz, a channel bandwidth of 5 MHz and a raster step size of 100 kHz, there are about 700 possible center frequencies 210.

Figure 3A:
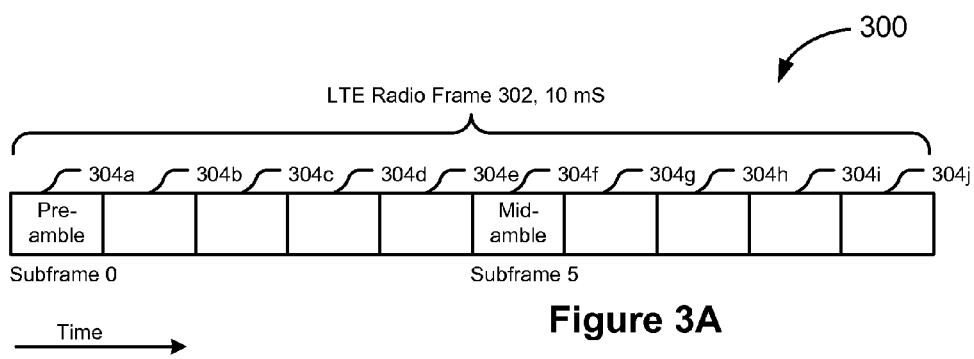
FIG. 3A shows a time domain representation of an LTE radio frame.

In order to conserve system bandwidth for data bearing functions, typically the sync channel is not transmitted continuously. For example, FIG. 3A shows a time domain representation 300 of an LTE radio frame 302. The LTE frame 302 is 10 ms in duration. The LTE frame 302 is divided into a series of ten subframes 304a-304j, each having a duration of 1 ms. According to LTE, a sync channel is included in subframe 0 (304a) and subframe 5 (304f.) However, no sync channel is included in the other subframes. Even within the subframe 304a, the sync channel is not transmitted for the entire duration of the subframe 304a.

Figure 3B:
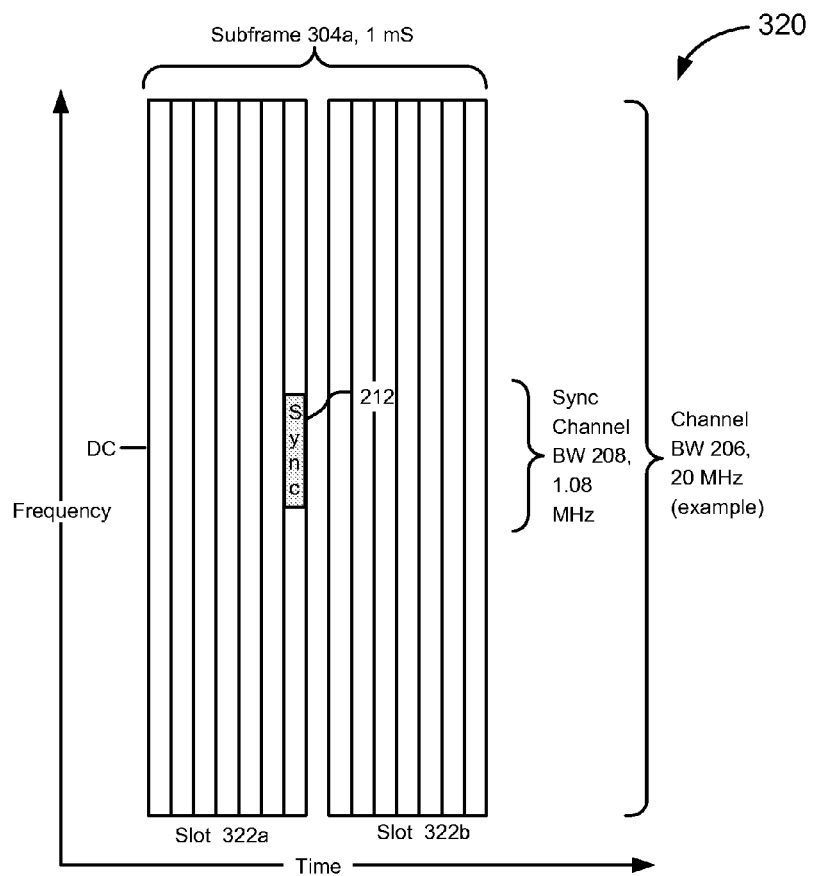
FIG. 3B shows a two-dimensional representation of an LTE radio frame over both time and frequency.

For example, the FIG. 3B shows a two-dimensional representation 320 of a portion of the LTE radio frame 302 over both time and frequency. Subframe 304a is shown to include the sync channel 212 which has a sync channel bandwidth 208 of 1.08 MHz. In the example shown, the channel bandwidth 206 of frame 302 is 20 MHz. The subframe 304a is divided into two slots, 322a and 322b, each spanning the channel bandwidth and having a duration of 0.5 ms. Within the first slot, the sync channel 212 is transmitted for approximately 140 μs. The sync channel 212 is not transmitted within the second slot at all. Thus, over the duration of the 10 ms LTE frame, the sync channel is transmitted for only 280 μs.

Referring again to FIG. 2, in order to synchronize with a system at initial system entry, a UE 120 determines the center frequency 210 of the channel bandwidth 206. In LTE, a UE 120 makes this determination using the sync channel 212. The sync channel 212 has a known sync channel bandwidth 208 which is independent of the size of the channel bandwidth 206.

During initial system entry, a UE 120 typically performs a band scan to determine in which areas of the available spectrum 202 does it detect enough energy to make it likely that a base station is operating in the channel bandwidth 204. Typically the band scan only searches for energy and does not detect timing.

However, even if the search for the sync channel is limited based on the results of the band scan, the UE 120 may test a large number of sync channel hypotheses before properly acquiring the sync channel signal. As noted above, it is advantageous to limit the amount of time required to acquire a sync channel so as to be able to offer services to the end-user as quickly as possible after a UE 120 enters a new system.

In one aspect, the UE takes advantage of the fact that the channel bandwidth is larger than the sync channel bandwidth. In order to operate on a particular channel, the UE 120 is capable of receiving the entire channel bandwidth. Thus, generally the UE 120 is configured to receive a fairly large bandwidth in comparison to the bandwidth of the sync channel. One aspect provides for the concurrent parallel searching for a sync channel over a section of the channel bandwidth which is larger than the sync channel bandwidth.

Figure 4:
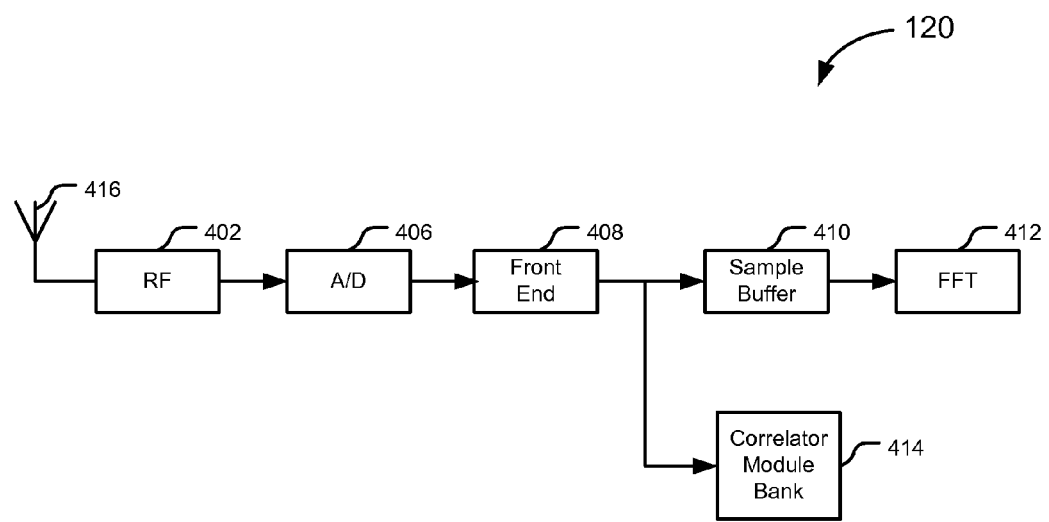
FIG. 4 is a simplified block diagram of a receive path of a user equipment device.

FIG. 4 is a simplified block diagram of a receive path of the UE 120. The UE 120 receives signals over antenna system 416. Typically the antenna system 416 is capable of receiving signals across the entire available spectrum. However, the RF receiver 402 narrows the received frequency range to the channel bandwidth. For example, according to the example given above, in the exemplary UE 120 of FIG. 4, the RF receiver 402 provides an analog output having 20 MHz bandwidth or less. Note that before the sync channel is acquired, the UE 120 doesn't know the actual channel bandwidth. In a typical implementation, one of the set of possible channel bandwidths is chosen for use during the sync process.

The analog signal output from the RF receiver 402 is received by the analog to digital (A/D) converter 406 which digitizes the analog signal into digital samples. The front end 408 digitally filters and conditions the samples and provides the resulting output to both a sample buffer 410 and a correlator module bank 414. Once the synchronization process is complete, the sample buffer 410 collects samples for one symbol period and passes the results to the fast Fourier transform (FFT) 412. The FFT 412 converts the time domain samples into the frequency domain and produces complex-valued samples. A correlator module bank 414 is also coupled to the output of the front end 408. The correlator module bank 414 aids in obtaining system synchronization by providing concurrent searching of multiple sync channel hypotheses.

Figure 5:
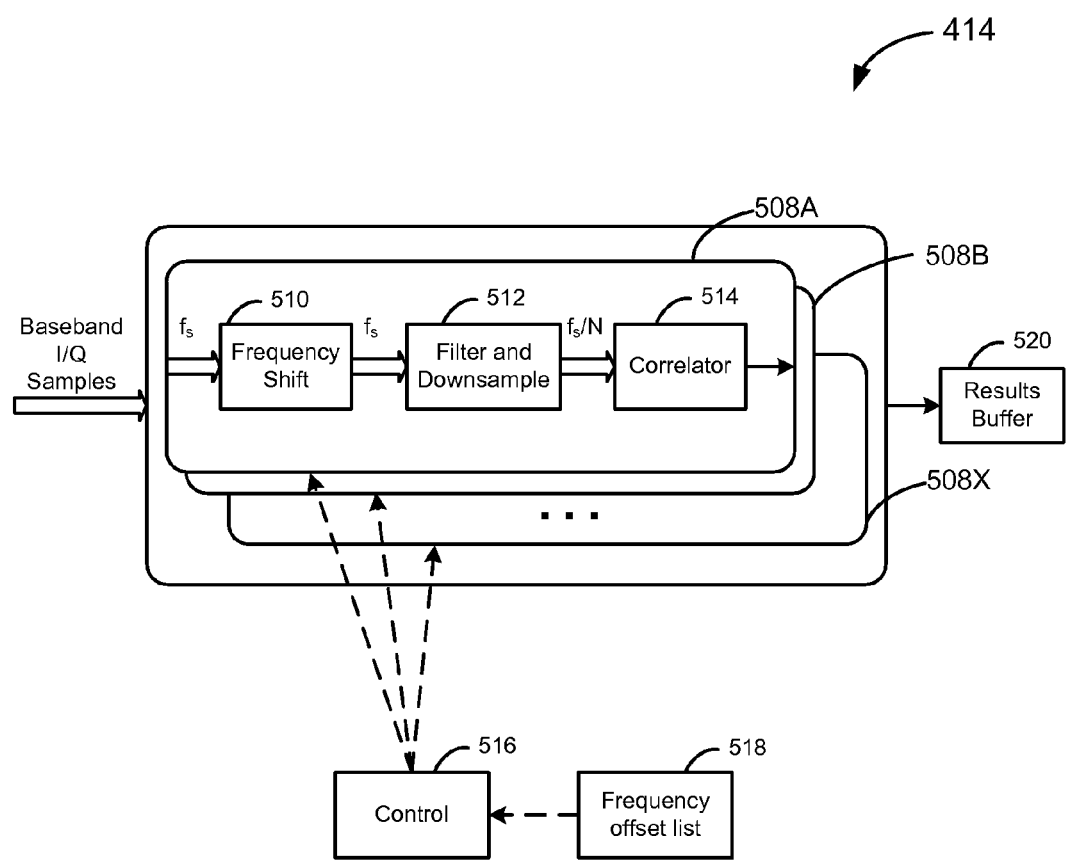
FIG. 5 is a simplified block diagram of the correlator module bank.

FIG. 5 is a simplified block diagram of the correlator module bank 414. The correlator module bank 414 has multiple instances of a core correlator module (CCM) 508a-508x. For example, a correlator module bank 414 may contain as many as 16 CCM 508 or more. In some embodiments, CCM circuitry may be time-shared, resulting in multiple virtual CCMs. Each CCM 508 concurrently receives baseband I/Q samples at a full bandwidth sampling rate (fs). The full bandwidth sampling rate is appropriate to support the channel bandwidth 206. For example, the full bandwidth sampling rate may be 30.72 Mega-samples per second for a 20 MHz channel bandwidth. For lower channel bandwidths, the sampling rates are typically lower.

A frequency shift module 510 within each of the CCMs 508 receives the I/Q samples at the full bandwidth sampling rate and spanning the channel bandwidth. Each frequency shift module 510 applies a different frequency shift using, for example, phase ramping and produces frequency shifted samples at the full bandwidth sampling rate. Thus, each frequency shifting module 510 produces samples having a different center frequency.

A filter and downsample module 512 receives the shifted samples. It bandpass filters the shifted samples to limit the size of the bandwidth to the sync channel bandwidth 208. The filter and downsample module 512 also downsamples (or decimates) the shifted samples to a sampling rate (fs/N) that is appropriate for the sync channel bandwidth 208. For example, in one aspect, the filter and downsample module 512 produces narrowband samples representing a 1.08 MHz sync channel bandwidth at a sampling rate of 1.92 Mega-samples per second.

The narrowband samples output by the filter and downsample module 512 are input into a correlator 514. The correlator 514 contains a shift register that holds one sync symbol worth of data. At initialization, samples are shifted into the correlator 512 until it holds one full sync symbol worth of data. At this point, one correlation to one or more known sync symbol values is performed across the stored samples. When a new sample is received from the filter and downsample module 512, the sample is shifted into the shift register within the correlator 514. At the same time, the oldest sample is shifted out and discarded. Another correlation is performed on the new set of samples. The result of each correlation is captured in a result buffer 520. Typically this process continues for a period equal to the periodicity of the synchronization channel 212, in this way ensuring the occurrence of a least one sync channel symbol during the correlation process. For example, according to the timing shown in FIGS. 3A and 3B, the correlation period is 5 ms plus the duration of one sync channel symbol.

In one aspect, the sync channel 212 carries a Zadoff-Chu (ZC) sequence. A ZC sequence has the special property that its time domain representation is the same as its frequency domain representation. In other words, when a ZC sequence is converted from the frequency domain to the time domain, its sequence remains the same. Thus, the frequency domain samples and the time domain samples have the same autocorrelation properties. As such, the correlation mechanism can be implemented in the time domain such as in a manner described above.

When the correlation period ends, the result buffer 520 contains correlation results for each of the CCM 508 which performed a correlation. Thus, in comparison with the prior art, a number of correlations have been performed during a single correlation period over a potentially wide range of frequency hypotheses. For example, a number of searches may be performed at the low end of the channel bandwidth while other searches are being performed at the center and high end of the channel bandwidth. Such, the results may correspond to a significant portion of the channel bandwidth 206 without requiring retuning of the RF module 402. The correlation results can be used according to techniques well known in the art to locate the sync channel. However, typically the process will occur over several such correlation periods before synchronization is achieved.

After a correlation period ends, the shift register within each correlator 514 is reset and the final set of band limited samples is flushed therefrom, leaving the shift register prepared to receive samples during the next correlation period. Typically, a controller 516 selects a new set of possible offset frequencies from a list of potential frequency offset 518. The controller 516 then resets the frequency shift modules 510 such that they produce samples at new center frequencies.

Figure 6:
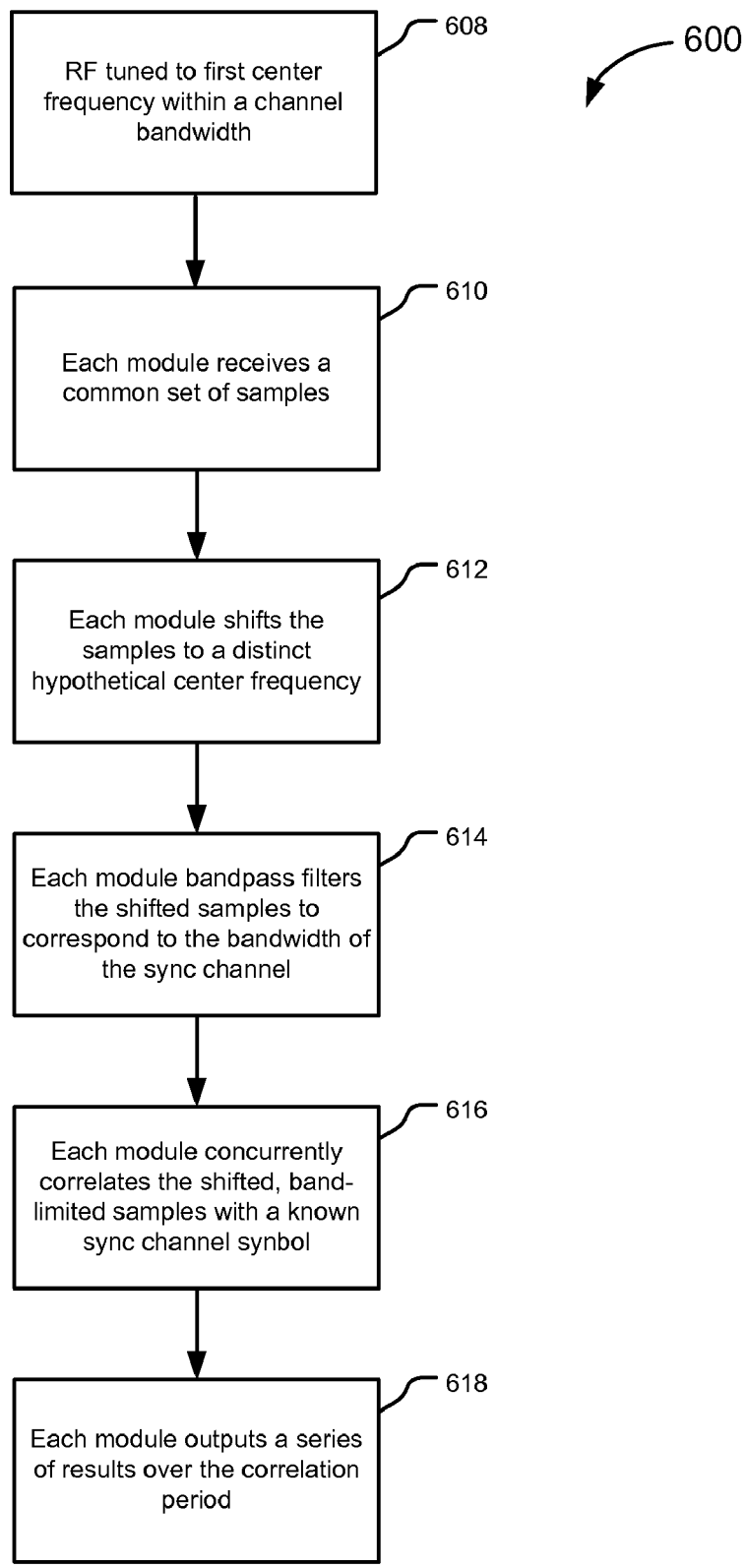
FIG. 6 is a simplified flowchart showing exemplary concurrent symbol timing detection.

FIG. 6 is a simplified flowchart 600 showing exemplary concurrent symbol timing detection. In block 608, the RF module 402 is tuned to a center frequency within a channel bandwidth and digital samples at the channel bandwidth are produced by the RF front end 408. In block 610, each CCM 508 concurrently receives a common set of samples spanning the channel bandwidth. In block 612, each CCM 508 shifts the samples to a different hypothetical center frequency, thus producing shifted samples. In some cases, the hypothetical center frequencies may be distributed such that the hypothetical sync channel bandwidths are highly overlapping. In other cases, one or more the hypothetical sync channel center frequencies are spread throughout the channel bandwidth. In block 614, each CCM 508 filters and downsamples the shifted samples to create band limited samples according to the sync channel bandwidth. In block 616, each CCM 508 correlates the shifted, band limited samples with a known sync channel symbol. In block 618, each CCM 508 concurrently produces a series of results of the correlation.

The techniques, elements and modules disclosed herein can also be used to compensate for frequency errors in the UE 120. Regardless of whether the center frequency is known, during an initial search, the frequency offset between the base station 110 and the UE 120 is generally not known. If this offset is large, such as due to frequency drifts in an internal clock generator within the UE, the offset can prevent successful synchronization. To detect such a condition, multiple frequency hypothesis can be tested, each having a small offset with respect to the raster steps size 214. Using the techniques, elements and modules disclosed herein, many frequency offset hypotheses can be tested concurrently without retuning the RF portion.

The techniques, elements and modules discussed herein can also be used to search for neighboring base stations. In some communication systems, two base stations with abutting coverage areas may use a different frequency mapping. For example, a neighboring base station may use a channel bandwidth with a different center frequency. However, so long as the center frequency and the sync channel energy fall within the channel bandwidth of the serving base station, the UE 120 may search for the neighboring base stations' sync channel during normal operation with respect to the serving base station.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of signal acquisition comprising:
   receiving a set of samples spanning a channel bandwidth;
   concurrently frequency shifting said set of samples to a set of channel center frequencies to produce multiple sets of shifted samples;
   concurrently filtering each set of said multiple sets of shifted samples to produce multiple sets of band limited samples, a bandwidth of each set of said multiple sets of band limited samples corresponding to a sync channel bandwidth;
   concurrently correlating each set of said multiple sets of band limited samples with a sync channel symbol to determine a set of correlation results; and
   comparing said set of correlation results to determine a likely sync channel center frequency.

2. The method of claim 1 wherein said frequency shifting comprises using a phase ramp.

3. The method of claim 1 wherein a first channel center frequency of said set of channel center frequencies differs from a second channel center frequency of said set of channel center frequencies by less than a raster step size in order to detect a frequency offset in a receiving unit.

4. The method of claim 1 further comprising receiving and processing an information signal spanning said channel bandwidth during said frequency shifting and said filtering.

5. The method of claim 4 wherein said information signal is transmitted by a servicing base station and said likely sync channel center frequency corresponds to a center frequency of a neighboring base station.

6. A non-transitory machine readable medium containing executable computer program instructions which when executed by a digital processing system cause the system to perform a method of signal acquisition, the method comprising:
   receiving a set of samples spanning a channel bandwidth;
   concurrently frequency shifting said set of samples to a set of channel center frequencies to produce multiple sets of shifted samples;
   concurrently filtering each set of said multiple sets of shifted samples to produce multiple sets of band limited samples, a bandwidth of each set of said multiple sets of band limited samples corresponding to a sync channel bandwidth;
   concurrently correlating each set of said multiple sets of band limited samples with a sync channel symbol to determine a set of correlation results; and
   comparing said set of correlation results to determine a likely sync channel center frequency.

7. The machine readable medium of claim 6 wherein said frequency shifting comprises using a phase ramp.

8. The machine readable medium of claim 6 wherein a first channel center frequency of said set of channel center frequencies differs from a second channel center frequency of said set of channel center frequencies by less than a raster step size in order to detect a frequency offset in a receiving unit.

9. The machine readable medium of claim 6, the method further comprising receiving and processing an information signal spanning said channel bandwidth during said frequency shifting and said filtering.

10. The machine readable medium of claim 9 wherein said information signal is transmitted by a servicing base station and said likely sync channel center frequency corresponds to a center frequency of a neighboring base station.

11. An apparatus for signal acquisition comprising:
means for receiving a set of samples spanning a channel bandwidth;
means for concurrently frequency shifting said set of samples to a set of channel center frequencies to produce multiple sets of shifted samples;
means for concurrently filtering each set of said multiple sets of shifted samples to produce multiple sets of band limited samples, a bandwidth of each set of said multiple sets of band limited samples corresponding to a sync channel bandwidth;
means for concurrently correlating each set of said multiple sets of band limited samples with a sync channel symbol to determine a set of correlation results; and
means for comparing said set of correlation results to determine a likely sync channel center frequency.

12. The apparatus for signal acquisition of claim 11 wherein said means for frequency shifting comprises means for using a phase ramp.

13. The apparatus for signal acquisition of claim 11 wherein a first channel center frequency of said set of channel center frequencies differs from a second channel center frequency of said set of channel center frequencies by less than a raster step size in order to detect a frequency offset in a receiving unit.

14. The apparatus for signal acquisition of claim 11 further comprising means for receiving and processing an information signal spanning said channel bandwidth while said means for frequency shifting and said means for filtering are operating.

15. The apparatus for signal acquisition of claim 14 wherein said information signal is transmitted by a servicing base station and said likely sync channel center frequency corresponds to a center frequency of a neighboring base station.

16. An user device comprising:
an RF front end configured to be coupled to a wireless link and to produce digital samples of a received signal spanning a channel bandwidth;
a correlator bank comprising
a set of frequency shift modules configured to receive said digital samples and to concurrently frequency shift said digital samples to a set of channel center frequencies that comprises different channel center frequencies to produce multiple sets of shifted samples, each frequency shift module in the set of frequency shift modules shifting the samples to a different one of the set of channel center frequencies;
a set of filter and downsample modules configured to concurrently filter each set of said multiple sets of shifted samples to produce multiple sets of band limited samples, a bandwidth of each set of said multiple sets of band limited samples corresponding to a sync channel bandwidth, and
a set of correlator modules configured to concurrently correlate each set of said multiple sets of band limited samples with a sync channel symbol to determine a set of correlation results; and
a buffer for storing said set of correlation results.

17. The user device of claim 16 wherein said set of frequency shift modules is further configured to frequency shift said digital samples by using a phase ramping technique.

18. The user device of claim 16 wherein a first channel center frequency of said set of channel center frequencies differs from a second channel center frequency of said set of channel center frequencies by less than a raster step size in order to detect a frequency offset in said user device.

19. The user device of claim 16 further comprising a sample buffer and a fast Fourier transfer module configured to process an information signal spanning said channel bandwidth while said set of correlator modules determines said set of correlation results.

* * * * *